United States Patent [19]

Iizawa et al.

[11] 4,235,635
[45] Nov. 25, 1980

[54] HIGH DIELECTRIC CONSTANT TYPE CERAMIC COMPOSITION

[75] Inventors: Osamu Iizawa, Honjo; Shinobu Fujiwara, Akita; Hisayoshi Ueoka, Yachiyo; Kiyoshi Furukawa, Akita; Nobuaki Kikuchi, Akita; Hitoshi Tanaka, Akita, all of Japan

[73] Assignee: TDK Electronics Co., Inc., Tokyo, Japan

[21] Appl. No.: 61,015

[22] Filed: Jul. 26, 1979

[30] Foreign Application Priority Data

| Aug. 1, 1978 | [JP] | Japan | 53-94725 |
| Aug. 2, 1978 | [JP] | Japan | 53-94934 |
| Aug. 3, 1978 | [JP] | Japan | 53-95114 |
| Aug. 4, 1978 | [JP] | Japan | 53-95743 |
| Aug. 4, 1978 | [JP] | Japan | 53-95744 |
| Aug. 7, 1978 | [JP] | Japan | 53-96381 |
| Aug. 7, 1978 | [JP] | Japan | 53-96382 |

[51] Int. Cl.$^3$ .................................................. C04B 35/26
[52] U.S. Cl. .................. 106/39.5; 252/63.2; 252/63.5
[58] Field of Search ............... 106/39.5; 252/63.2, 252/63.5

[56] References Cited

U.S. PATENT DOCUMENTS

4,078,938   3/1978   Yonezawa et al. ............... 106/39.5

OTHER PUBLICATIONS

Yonezawa, et al., "Properties of $Pb(Fe_{\frac{2}{3}}W_{\frac{1}{3}})O_3$—$Pb(Fe_{\frac{1}{2}}Nb_{\frac{1}{2}})O_3$ Ceramics" Proceedings of the 1st Meeting on Ferroelectric Materials & Their Applications.

*Primary Examiner*—O. R. Vertiz
*Assistant Examiner*—Mark Bell
*Attorney, Agent, or Firm*—Kenyon & Kenyon

[57] ABSTRACT

A novel ceramic composition exhibiting a solid solution structure of $Pb(Fe_{\frac{2}{3}}W_{\frac{1}{3}})O_3$—$Pb(ZrO_3)$, can be sintered at a low sintering temperature; have a high insulation resistance; have a relatively high dielectric constant in the high dielectric type ceramic dielectrics; have a low dependence of dielectric constant upon temperature, and; have a low dielectric loss.

A particular amount of the additives, i.e., MnO, $Pb(Mn_{\frac{1}{3}}Nb_{\frac{2}{3}})O_3$, $Pb(Mn_{\frac{1}{2}}W_{\frac{1}{2}})O_3$, $Pb(Mn_{\frac{2}{3}}W_{\frac{1}{3}})O_3$, $Pb(Mn_{\frac{1}{3}}Ta_{\frac{2}{3}})O_3$, $Cr_2O_3$ and $CeO_2$, is added into the composition mentioned above.

19 Claims, No Drawings

HIGH DIELECTRIC CONSTANT TYPE CERAMIC COMPOSITION

The present invention relates to a ceramic dielectric composition, which can be classified into a high dielectric constant type and a temperature-compensating type, and relates, more particularly, to the former type ceramic dielectric composition, which is characterized by being sintered at a relatively low temperature, exhibiting a high dielectric constant, a reduced dielectric loss, and a low dependence of the properties upon temperature. This ceramic dielectric composition is suitable for "high dielectric constant" capacitors of a compact-type with large capacity, such as laminar capacitors.

Most ceramic dielectrics heretofore proposed for high dielectric constant capacitors contain, as the basic ingredient, a compound having a perovskite structure, such as barium titanate ($BaTiO_3$), barium stannate ($BaSnO_3$) and calcium titanate ($CaTiO_3$). Depending upon various requirements in using the dielectrics in the capacitors, an additional element, which constitutes the substitutional solid solution of the basic ingredient, is used for increasing the dielectric constant of ceramic dielectrics. A compound having a structure different from the perovskite structure, can be mixed with the basic ingredient so as to increase the dielectric constant of the ceramic dielectrics. In the most widely used dielectrics, the dielectric constant thereof is increased as mentioned above. In such increase of the dielectric constant, the Curie point of the dielectrics can be adjusted to a value corresponding to that at room temperature, so as to increase the dielectric constant to the maximum value, for example from 4000 to 20000, which can be achieved by a dielectric comprising a particular basic ingredient. The temperature dependence of the dielectric constant of such dielectric is, however, increased by the increase of the dielectric constant. On the other hand, when the temperature dependence of dielectric constant is decreased, the maximum value of dielectric constant is disadvantageously decreased.

Suitable sintering temperatures of the ceramic dielectric compositions mentioned above are generally 1,200° to 1,400° C. Accordingly, a large amount of heat energy is required for sintering. In addition, due to the high sintering temperature of from 1,200° to 1,400° C., the sintering furnace is considerably deteriorated and eroded during the sintering. As a result, the maintainance cost of the sintering furnace becomes, therefore, expensive.

Recently, a ceramic capacitor which is more compact and of more improved capacity, and possesses a high reliability, has been desired in the field, including the communication industry. Thus, a capacitor of a thin ceramic film having a 0.1 to 0.2 mm thickness and a ceramic laminar capacitor composed of a plurality of superimposed laminae, each having a thickness of approximately 50 microns or less, have been put to practical use. In the production of the laminar ceramic capacitor, the laminated dielectric body must be sintered, while the internal electrodes of the ceramic capacitor are inserted in the laminated body. Since the sintering temperature of the conventional ceramic dielectrics exceeds 1,000° C., a noble metal, such as platinum or palladium, or their alloys, had to be used as the internal electrodes, because the stable resistance of the electrodes at a temperature as high as 1,300° C. could be provided by the noble metal.

It is proposed in German Offenlegungsschrift No. 27 01 411 that the sintering temperature of a high dielectric constant type ceramic composition be lowered to 1,000° C. or less by preparing the composition from two components, i.e. $Pb(Fe_{\frac{2}{3}}W_{\frac{1}{3}})xO_3$ and $Pb(Fe_{\frac{1}{2}}Nb_{\frac{1}{2}})_{1-x}O_3$. Since the laminated ceramic capacitor can be produced by a low sintering temperature of less than 1,000° C., according to the proposal in the German Offenlegungsschift cheap materials such as silver, nickel, aluminum, and the like, can be used as the internal electrodes of the capacitor, and therefore, the production cost of the capacitor can advantageously be lowered from that of the prior art.

It is an object of the present invention to provide ceramic dielectric compositions: which can be sintered at a low sintering temperature; have a high insulation resistance; have a relatively high dielectric constant in the high dielectric type ceramic dielectrics, have a low dielectric loss, and; have a low dependence of dielectric constant upon temperature.

It is another object of the present invention to improve the properties, such as the temperature dependence of the dielectric constant of the known, high dielectric constant type ceramic composition, which can be sintered at a low sintering temperature.

It is a further object of the present invention to provide ceramic dielectric compositions particularly suitable for a high dielectric constant type capacitor of a compact and laminar type.

Other objects and advantages will be apparent from the following description.

In accordance with the objects of the present invention there is provided a high dielectric costant type, ceramic composition, hereinafter referred to as the basic ceramic composition, which comprises from 63.17 to 63.89% of PbO, from 6.09 to 14.31% of $Fe_2O_3$, from 8.85 to 20.78% of $WO_3$ and from 1.74 to 21.17% of $ZrO_2$, all percentages being by weight based on the basic ceramic composition. The basic ceramic composition exhibits a solid solution structure of $Pb(Fe_{\frac{2}{3}}W_{\frac{1}{3}})O_3$—$PbZrO_3$.

Provided in accordance with the objects of the present invention are the following dielectric compositions, each of which includes an additive in their basic compositions.

A. A modified ceramic composition which comprises the basic ceramic composition and MnO in an amount of from 0.05 to 3.0 parts by weight, based on 100 weight parts of the basic composition.

B. A modified ceramic composition which comprises the basic ceramic composition and $Pb(Mn_{\frac{1}{3}}Nb_{\frac{2}{3}})O_3$ in an amount of from 0.05 to 10.0 parts by weight, based on 100 weight parts of the basic composition.

C. A modified ceramic composition which comprises the basic ceramic composition and $Pb(Mn_{\frac{1}{2}}W_{\frac{1}{2}})O_3$ in an amount of from 0.05 to 10.0 parts by weight based on 100 weight parts of the basic composition.

D. A modified ceramic composition which comprises the basic ceramic composition and $Pb(Mn_{\frac{2}{3}}W_{\frac{1}{3}})O_3$ in an amount of from 0.05 to 10.0 parts by weight, based on 100 weight parts of the basic ceramic composition.

E. A modified ceramic composition which comprises the basic ceramic composition and $Pb(Mn_{\frac{1}{3}}Ta_{\frac{2}{3}})O_3$ in an amount of from 0.05 to 10.0 parts by weight, based on 100 weight parts of the basic ceramic composition.

F. A modified ceramic composition which comprises the basic composition and at least one component selected from the group consisting of $Cr_2O_3$ and $CeO_2$ in an amount of from 0.05 to 2.0 parts by weight, based on 100 weight parts of the basic ceramic composition.

The properties and the embodiments of the ceramic compositions according to the present invention will now be illustrated.

Every high dielectric constant type ceramic composition according to the present invention can be sintered at a low temperature ranging from 800° to 950° C. When the PbO content in the ceramic compositions is more than 63.89% by weight, the ceramic compositions must be sintered at a temperature exceeding 1000° C. When the PbO content is less than 63.17% or more than 63.89% by weight, the changing rate of capacitance of the ceramic composition at 85° C. is too high for the ceramic composition to be used on a practical basis. The basic ceramic composition corresponds, although not strictly, to a novel solid solution in the field of ceramic dielectrics, i.e., a solid solution of from 40 to 95 mol % of $Pb(Fe_{\frac{2}{3}}W_{\frac{1}{3}})O_3$ and from 5 to 60 mol % of $PbZrO_3$.

In the basic ceramic composition which is capable of being sintered at a temperature lower than 1000° C. according to the present invention, the relative dielectric constant ($\epsilon_s$), which is simply referred to as the dielectric constant in the present specification, may be from 4820 to 8020. In the basic ceramic composition, the insulation resistance is more than $10^7$ ($\Omega$). Furthermore, the dielectric loss (tan $\delta$ at 1 KHz) is from 3.0 to 3.8% and is, therefore, low. A preferable basic ceramic composition comprises from 6.09 to 12% of $Fe_2O_3$, from 8.85 to 18% of $WO_3$, and from 7 to 20% of $ZrO_2$. A more preferable basic ceramic composition comprises 63.56% of PbO, 10% of $Fe_2O_3$, 14% of $WO_3$, and 12% of $ZrO_2$, all percentages being approximate values. The insulation resistance (IR) described in the present specification indicates the resistance of a ceramic composition having a thickness of approximately 0.5 mm. A direct current of 500 V is applied to this composition at 20° C. when measuring the resistance. The temperature dependence of the dielectric constant ($\epsilon_s$) described in the present specification indicates:

$$\Delta \epsilon_s = \frac{\epsilon_s \text{ at } 85° \text{ C.} - \epsilon_s \text{ at } 25° \text{ C.}}{\epsilon_s \text{ at } 85° \text{ C.}} \times 100(\%) \text{ or}$$

$$\Delta \epsilon_s = \frac{\epsilon_s \text{ at } -25° \text{ C.} - \epsilon_s \text{ at } 25° \text{ C.}}{\epsilon_s \text{ at } 25° \text{ C.}}$$

The term "temperature variance" of the dielectric constant used in the present specification indicates the absolute value of $\Delta \epsilon_s$.

By adding a particular amount of the additives MnO, $Pb(Mn_{\frac{1}{3}}Nb_{\frac{2}{3}})O_3$, $Pb(Mn_{\frac{1}{2}}W_{\frac{1}{2}})O_3$, $Pb(Mn_{\frac{2}{3}}W_{\frac{1}{3}})O_3$, $Pb(Mn_{\frac{1}{3}}Ta_{\frac{2}{3}})O_3$, $Cr_2O_3$ and $CeO_2$, into the basic ceramic composition, several or all of the electrical properties of the modified ceramic compositions can be improved to levels more preferable than those of the basic ceramic composition.

A modified ceramic composition containing MnO, and capable of being sintered at a temperature lower 1000° C. may exhibit a dielectric constant ($\epsilon_s$) of from approximately 5020 to 8370, a low temperature variance of less than 50%, a dielectric loss (tan $\delta$ at 1 KHz) of from 0.5 to 1.4%, and an insulation resistance of from $2 \times 10^{10}$ to $1 \times 10^{11} \Omega$. At an MnO content of less than 0.05 and more than 3.0 parts by weight, the insulation resistance (IR) is low and the dielectric loss (tan $\delta$) is to high to use the modified composition on a practical basis. The additive content is preferably from 0.5 to 3.0 parts by weight.

Another modified ceramic composition containing an additive of $Pb(Mn_{\frac{1}{3}}Nb_{\frac{2}{3}})O_3$ capable of being sintered at a temperature lower than 1000° C. may exhibit a dielectric constant ($\epsilon_s$) of from approximately 4100 to 8900, a dielectric loss (tan $\delta$ at 1 KHz) of from 1.0 to 1.8%, and an insulation resistance (IR) of from $3 \times 10^{10}$ to $3 \times 10^{11} \Omega$. At a $Pb(Mn_{\frac{1}{3}}Nb_{\frac{2}{3}})O_3$ content of less than 0.05 and more than 10.0 parts by weight, the insulation resistance (IR) is low and the dielectric loss (tan $\delta$) is too high to use the modified composition on a practical basis. The additive content is preferably from 0.5 to 10.0 parts by weight.

Still another modified ceramic composition containing $Pb(Mn_{\frac{1}{2}}W_{\frac{1}{2}})O_3$ and capable of being sintered at a temperature lower than 1000° C. may exhibit a dielectric constant ($\epsilon_s$) of from approximately 5380 to 8930, a dielectric loss (tan $\delta$ at 1 KHz) of from 0.4 to 1.8%, and an insulation resistance (IR) of from $1 \times 10^{10}$ to $2 \times 10^{11} \Omega$. At a $Pb(Mn_{\frac{1}{2}}W_{\frac{1}{2}})O_3$ content of less than 0.05 and more than 10.0 parts by weight, the insulation resistance (IR) is low and the dielectric loss (tan $\delta$) is too high to use the modified ceramic composition on the practical basis. The additive content is preferably from 0.5 to 10.0 parts by weight.

A further modified ceramic composition containing $Pb(Mn_{\frac{2}{3}}W_{\frac{1}{3}})O_3$ and capable of being sintered at a temperature lower than 1000° C. may exhibit a dielectric constant ($\epsilon_s$) of from approximately 5290 to 8530, a dielectric loss (tan $\delta$ at 1 KHz) of from 0.4 to 1.9%, and an insulation resistance (IR) of from $1 \times 10^8$ to $9 \times 10^{10} \Omega$. At a $Pb(Mn_{\frac{2}{3}}W_{\frac{1}{3}})O_3$ content of less than 0.05 or more than 10.0 parts by weight, the insulation resistance (IR) is low and the dielectric loss (tan $\delta$) is too high to use the modified ceramic composition on the practical basis. The additive content is preferably from 0.5 to 10.0 parts by weight.

A modified composition containing $Pb(Mn_{\frac{1}{3}}Ta_{\frac{2}{3}})O_3$ and capable of being sintered at a temperature lower than 1000° C. may exhibit a dielectric constant ($\epsilon_s$) of from approximately 5760 to 9050, a dielectric loss (tan $\delta$ at 1 KHz) of from 1.2 to 1.9%, and an insulation resistance (IR) of $1 \times 10^{10}$ to $4 \times 10^{10} \Omega$. At a $Pb(Mn_{\frac{1}{3}}Ta_{\frac{2}{3}})O_3$ content of less than 0.05 or more than 10.0 parts by weight, the insulation resistance (IR) is too low and the dielectric loss (tan $\delta$) is too high to use the modified composition on the practical basis. The additive content is preferably from 0.5 to 10.0 parts by weight.

A modified composition containing the $Cr_2O_3$ and/or $CeO_2$ additive and capable of being sintered at a temperature lower than 1000° C. may exhibit a dielectric constant ($\epsilon_s$) of from approximately 5130 to 8220, a dielectric loss (tan $\delta$ at 1 KHz) of from 1.3 to 1.9%, and an insulation resistance (IR) of from $1 \times 10^{10}$ to $3 \times 10^{10} \Omega$. At a content of the additive less than 0.05 or more than 2.0 parts by weight, the insulation resistance (IR) is too low and the dielectric loss (tan $\delta$) is too high to use the modified ceramic composition on the practical basis.

Within the contents of the basic components, i.e. $Fe_2O_3$, $WO_3$ and $ZrO_2$, or the additive components, pertinent contents should be selected in accordance with the electrical properties to be specifically achieved. For example, when low temperature variation should be achieved, the following contents are preferable: $Fe_2O_3$ in an amount of 6.09 to 10%; $WO_3$ in an amount of 8.85 to 15%; and, $ZrO_2$ in an amount of from 12 to 21.17. By adjusting the contents of $Fe_2O_3$, WO$_3$ and ZrO$_2$ within these ranges, it is possible to reduce the temperature variance of the dielectric constant to approximately 30% or less. When a high dielectric constant should be achieved, the following contents are preferable: Fe$_2$O$_3$ in an amount of from 7 to 12%; WO$_3$ in an amount of from 11 to 18%; and; ZrO$_2$ in an amount of from 7 to 18%. A high insulation resistance (IR) and low dielectric loss (tan δ) can be obtained at an additive content of from 0.5 to 3.0%. Among the modified compositions, a particularly preferable composition comprises 3.0 parts of Pb(Mn$_{\frac{1}{2}}$W$_{\frac{1}{2}}$)O$_3$ and 100 parts of the basic composition, which contains 63.56% PbO, 10% Fe$_2$O$_3$, 14% WO$_3$ and 12% ZrO$_2$, all percentages being approximate values.

One of the properties which must be provided in any PbO containing ceramic is the property of preventing vaporization of the PbO during sintering. The manganese containing additives can effectively prevent the PbO vaporization and can thus contribute to the stabilization of the sintering process.

The ceramic dielectric compositions of the present invention may be prepared as follows. Finely divided particles or powders of respective metal oxides are blended with each other using a ball mill and shaped into a suitable form. After a binder is added to the powders, the powders are press-formed for example, into discs. The discs are sintered at a temperature of from 850° to 900° C. for a period of one to two hours, enclosed in a magnesia ceramic vessel. Each disc is plated with a silver, nickel or aluminum electrode. Instead of metal oxides, metal carbonates may be used.

The present invention is explained further in detail by way of a single example.

EXAMPLE

In the example, the lead oxide (PbO), iron oxide (Fe$_2$O$_3$), tungsten oxide (WO$_3$), zirconium oxide (ZrO$_2$), niobium oxide (Nb$_2$O$_5$), manganese oxide (MnO), tantalum oxide (Ta$_2$O$_5$), chromium oxide (Cr$_2$O$_3$) and cerium oxide (CeO$_2$), all in the powdered form, were weighed so that the oxides were contained in the ceramic composition in the proportion as shown in Table 1, below. These oxide mixtures, serving as the raw material of the ceramic composition, were blended under a moist condition in a bowl made of an organic resin, and thereafter, presintered at a temperature ranging from 700° to 850° C. over a period of two hours. Subsequently, chemical reactions occurred between the powders. The so-reacted sintered powders were crushed to particles having a diameter of a few microns and were blended again with each other so as to obtain a powdered mixture. A predetermined amount of binder of polyvinyl alcohol (PVA) was added into the powdered mixture, which was then shaped under a shaping pressure of approximately 3 tons/cm$^2$ into discs having a diameter of 16.5 mm and a thickness of 0.6 mm. The shaped discs were air-tightly sealed in a magnesia ceramic vessel so as to prevent the lead component from being evaporated from the discs during sintering. The final sintering was carried out over a period of two hours, and ceramic bodies were produced. Thereafter, a silver electrode was baked onto each side of the ceramic bodies. The ceramic bodies with the pair of electrodes were used as samples for measuring electric properties, i.e., the dielectric constant ($\epsilon_s$ at 1 KHz at 20° C.) the dielectric loss (tan δ at 1 KHz at 20° C.) and the insulation resistance (IR). The temperature dependence of the dielectric constant ($\epsilon_s$ at 1 KHz) was measured with regard to several samples. Such temperature dependence was measured at +85° C., based on the room temperature of 20° C. as the standard value. The measurement results are shown in Table 1, in which the asterisked sample designates the control sample.

TABLE 1-1

| Sample No. | Basic Ingredients (mol %) Pb(Fe$_{\frac{2}{3}}$W$_{\frac{1}{3}}$)O$_3$ | PbZrO$_3$ | Additive (wt %) — | Proportion of Basic Oxides (wt %) PbO | Fe$_2$O$_3$ | WO$_3$ | ZrO$_2$ | Electric Properties $\epsilon_s$ | tan (%) | IR (Ω) | Temperature Dependence (%) −25° C. | +85° C. | Sintering Temperature (°C.) |
|---|---|---|---|---|---|---|---|---|---|---|---|---|---|
| 1* | 20 | 80 | 0 | 64.16 | 3.06 | 4.44 | 28.34 | 2010 | 5.3 | 8 × 10$^9$ | −73.2 | +112.0 | 1050 |
| 2 | 30 | 70 | 0 | 64.03 | 4.58 | 6.65 | 24.74 | 2550 | 4.3 | 1 × 10$^9$ | −62.7 | +63.3 | 1050 |
| 3 | 40 | 60 | 0 | 63.89 | 6.09 | 8.85 | 21.17 | 4820 | 3.4 | 2 × 10$^8$ | −41.9 | +21.1 | 950 |
| 4 | 50 | 50 | 0 | 63.76 | 7.60 | 11.04 | 17.60 | 5320 | 3.0 | 3 × 10$^8$ | −37.6 | −3.9 | 950 |
| 5 | 65 | 35 | 0 | 63.56 | 9.85 | 14.31 | 12.28 | 8020 | 3.7 | 6 × 10$^8$ | −17.4 | −12.6 | 950 |
| 6 | 80 | 20 | 0 | 63.36 | 12.09 | 17.55 | 7.00 | 5720 | 3.3 | 4 × 10$^7$ | +19.8 | −18.8 | 950 |
| 7 | 95 | 5 | 0 | 63.17 | 14.31 | 20.78 | 1.74 | 4100 | 3.8 | 2 × 10$^7$ | −47.2 | −30.6 | 900 |
| 8* | 98 | 2 | 0 | 63.13 | 14.76 | 21.42 | 0.69 | 3600 | 5.7 | 7 × 10$^6$ | +53.3 | −63.3 | 850 |

TABLE 1-2

| Sample No. | Basic Ingredients (mol %) Pb(Fe$_{\frac{2}{3}}$W$_{\frac{1}{3}}$)O$_3$ | PbZrO$_3$ | Additive (wt %) MoO | Proportion of Basic Oxides (wt %) PbO | Fe$_2$O$_3$ | WO$_3$ | ZrO$_2$ | Electric Properties $\epsilon_s$ | tan (%) | IR (Ω) | Temperature Dependence (%) −25° C. | +85° C. | Sintering Temperature (°C.) |
|---|---|---|---|---|---|---|---|---|---|---|---|---|---|
| 9* | 40 | 60 | 0 | 63.89 | 6.09 | 8.85 | 21.17 | 4820 | 3.4 | 2 × 10$^8$ | −41.9 | +21.1 | 950 |
| 10 | 40 | 60 | 0.05 | 63.89 | 6.09 | 8.85 | 21.17 | 5020 | 1.4 | 3 × 10$^{10}$ | −48.3 | +10.2 | 950 |
| 11 | 40 | 60 | 0.5 | 63.89 | 6.09 | 8.85 | 21.17 | 6300 | 1.0 | 5 × 10$^{10}$ | −53.1 | −6.5 | 950 |
| 12 | 40 | 60 | 3.0 | 63.89 | 6.09 | 9.85 | 21.17 | 5100 | 0.8 | 7 × 10$^{10}$ | −61.1 | −11.3 | 950 |
| 13* | 40 | 60 | 5.0 | 63.89 | 6.09 | 8.85 | 21.17 | 4900 | 1.4 | 3 × 10$^{10}$ | −67.7 | −19.1 | 850 |
| 14* | 65 | 35 | 0 | 63.56 | 9.85 | 14.31 | 12.28 | 8020 | 3.7 | 6 × 10$^8$ | −17.4 | −12.6 | 950 |
| 15 | 65 | 35 | 0.05 | 63.56 | 9.85 | 14.31 | 12.28 | 8370 | 1.2 | 2 × 10$^{10}$ | −20.8 | −10.8 | 950 |
| 16 | 65 | 35 | 0.5 | 63.56 | 9.85 | 14.31 | 12.28 | 8200 | 0.5 | 6 × 10$^{10}$ | −23.6 | −18.7 | 950 |
| 17 | 65 | 35 | 3.0 | 63.56 | 9.85 | 14.31 | 12.28 | 7330 | 0.7 | 8 × 10$^{10}$ | −29.1 | −26.6 | 950 |
| 18* | 65 | 35 | 5.0 | 63.56 | 9.85 | 14.31 | 12.28 | 5030 | 1.3 | 4 × 10$^{10}$ | −37.9 | −29.8 | 850 |
| 19* | 95 | 5 | 0 | 63.17 | 14.31 | 20.78 | 1.74 | 4100 | 3.8 | 2 × 10$^8$ | +47.2 | −30.6 | 950 |
| 20 | 95 | 5 | 0.05 | 63.17 | 14.31 | 20.78 | 1.74 | 4030 | 0.9 | 3 × 10$^{10}$ | +49.1 | −32.8 | 950 |
| 21 | 95 | 5 | 0.5 | 63.17 | 14.31 | 20.78 | 1.74 | 4080 | 0.5 | 8 × 10$^{10}$ | +52.2 | −44.5 | 950 |

TABLE 1-2-continued

| Sample No. | Basic Ingredients (mol %) Pb(Fe$_{2/3}$W$_{1/3}$)O$_3$ | PbZrO$_3$ | Additive (wt %) MoO | Proportion of Basic Oxides (wt %) PbO | Fe$_2$O$_3$ | WO$_3$ | ZrO$_2$ | Electric Properties $\epsilon_s$ | tan (%) | IR (Ω) | Temperature Dependence (%) −25° C. | +85° C. | Sintering Temperature (°C.) |
|---|---|---|---|---|---|---|---|---|---|---|---|---|---|
| 22 | 95 | 5 | 3.0 | 63.17 | 14.31 | 20.78 | 1.74 | 4000 | 0.6 | 1 × 10$^{11}$ | −55.3 | −50.8 | 950 |
| 23* | 95 | 5 | 5.0 | 63.17 | 14.31 | 20.78 | 1.74 | 3620 | 1.0 | 2 × 10$^{10}$ | −59.9 | −49.7 | 850 |

TABLE 1-3

| Sample No. | Basic Ingredients (mol %) Pb(Fe$_{2/3}$W$_{1/3}$)O$_3$ | PbZrO$_3$ | Additive (wt %) Pb(Mn$_{1/2}$Nb$_{1/2}$)O$_3$ | Proportion of Basic Oxides (wt %) PbO | Fe$_2$O$_3$ | WO$_3$ | ZrO$_2$ | $\epsilon_s$ | tan (%) | IR (Ω) | Temperature Dependence (%) −25° C. | +85° C. | Sintering Temperature (°C.) |
|---|---|---|---|---|---|---|---|---|---|---|---|---|---|
| 24* | 40 | 60 | 0 | 63.89 | 6.09 | 8.85 | 21.17 | 4820 | 3.4 | 2 × 10$^8$ | −41.9 | +21.1 | 950 |
| 25 | 40 | 60 | 0.05 | 63.89 | 6.09 | 8.85 | 21.17 | 5940 | 1.6 | 4 × 10$^{10}$ | −42.2 | +16.8 | 950 |
| 26 | 40 | 60 | 0.5 | 63.89 | 6.09 | 8.85 | 21.17 | 7030 | 1.2 | 9 × 10$^{10}$ | −45.1 | +8.1 | 950 |
| 27 | 40 | 60 | 3.0 | 63.89 | 6.09 | 8.85 | 21.17 | 6560 | 1.0 | 2 × 10$^{11}$ | −47.2 | +2.8 | 950 |
| 28 | 40 | 60 | 10.0 | 63.89 | 6.09 | 8.85 | 21.17 | 5380 | 1.5 | 2 × 10$^{10}$ | −51.1 | −3.5 | 850 |
| 29* | 40 | 60 | 15.0 | 63.89 | 6.09 | 8.85 | 21.17 | 4100 | 3.6 | 8 × 10$^8$ | −53.3 | −7.8 | 850 |
| 30 | 65 | 35 | 0 | 63.56 | 9.85 | 14.31 | 12.28 | 8020 | 3.7 | 6 × 10$^8$ | −17.4 | −12.6 | 950 |
| 31 | 65 | 35 | 0.05 | 63.56 | 9.85 | 14.31 | 12.28 | 8230 | 1.7 | 6 × 10$^{10}$ | −19.3 | −15.3 | 950 |
| 32 | 65 | 35 | 0.5 | 63.56 | 9.85 | 14.31 | 12.28 | 8900 | 1.4 | 8 × 10$^{10}$ | −22.6 | −17.8 | 950 |
| 33 | 65 | 35 | 3.0 | 63.56 | 9.85 | 14.31 | 12.28 | 7900 | 1.1 | 3 × 10$^{11}$ | −27.2 | −28.5 | 950 |
| 34 | 65 | 35 | 10.0 | 63.56 | 9.85 | 14.31 | 12.28 | 6110 | 1.8 | 7 × 10$^{10}$ | −33.7 | −26.7 | 900 |
| 35* | 65 | 35 | 15.0 | 63.56 | 9.85 | 14.31 | 12.28 | 5070 | 4.1 | 5 × 10$^8$ | −39.2 | −21.1 | 900 |
| 36* | 95 | 5 | 0 | 63.17 | 14.31 | 20.78 | 1.74 | 4100 | 3.8 | 2 × 10$^8$ | +47.2 | −30.6 | 950 |
| 37 | 95 | 5 | 0.05 | 63.17 | 14.31 | 20.78 | 1.74 | 4120 | 1.8 | 3 × 10$^{10}$ | +48.8 | −30.2 | 950 |
| 38 | 95 | 5 | 0.5 | 63.17 | 14.31 | 20.78 | 1.74 | 4210 | 1.4 | 5 × 10$^{10}$ | +53.1 | −33.8 | 950 |
| 39 | 95 | 5 | 3.0 | 63.17 | 14.31 | 20.78 | 1.74 | 3970 | 1.2 | 9 × 10$^{10}$ | +57.2 | −51.7 | 950 |
| 40 | 95 | 5 | 10.0 | 63.17 | 14.31 | 20.78 | 1.74 | 3550 | 1.8 | 3 × 10$^{10}$ | +60.3 | −53.9 | 900 |
| 41* | 95 | 5 | 15.0 | 63.17 | 14.31 | 20.78 | 1.74 | 3100 | 5.8 | 1 × 10$^8$ | +63.1 | −69.6 | 900 |

TABLE 1-4

| Sample No. | Basic Ingredients (mol %) Pb(Fe$_{2/3}$W$_{1/3}$)O$_3$ | PbZrO$_3$ | Additive (wt %) Pb(Mn$_{1/3}$W$_{1/3}$)O$_3$ | Proportion of Basic Oxides (wt %) PbO | Fe$_2$O$_3$ | WO$_3$ | ZrO$_2$ | $\epsilon_s$ | tan (%) | IR (Ω) | Temperature Dependence (%) −25° C. | +85° C. | Sintering Temperature (°C.) |
|---|---|---|---|---|---|---|---|---|---|---|---|---|---|
| 42* | 40 | 60 | 0 | 63.89 | 6.09 | 8.85 | 21.17 | 4820 | 3.4 | 2 × 10$^8$ | −41.9 | +21.1 | 950 |
| 43 | 40 | 60 | 0.05 | 63.89 | 6.09 | 8.85 | 21.17 | 5380 | 1.0 | 3 × 10$^{10}$ | −43.1 | +17.2 | 950 |
| 44 | 40 | 60 | 0.5 | 63.89 | 6.09 | 8.85 | 21.17 | 6600 | 0.8 | 7 × 10$^{10}$ | −47.2 | +13.3 | 950 |
| 45 | 40 | 60 | 3.0 | 63.89 | 6.09 | 8.85 | 21.17 | 5820 | 0.5 | 1 × 10$^{11}$ | −53.3 | +6.5 | 950 |
| 46 | 40 | 60 | 10.0 | 63.89 | 6.09 | 8.85 | 21.17 | 5210 | 1.2 | 2 × 10$^{10}$ | −56.6 | +8.6 | 850 |
| 47* | 40 | 60 | 15.0 | 63.89 | 6.09 | 8.85 | 21.17 | 3770 | 3.6 | 4 × 10$^8$ | −59.9 | +13.8 | 850 |
| 48* | 65 | 35 | 0 | 63.56 | 9.85 | 14.31 | 12.28 | 8020 | 3.7 | 2 × 10$^8$ | −17.4 | −12.6 | 950 |
| 49 | 65 | 35 | 0.05 | 63.56 | 9.85 | 14.31 | 12.28 | 8330 | 0.8 | 4 × 10$^{10}$ | −19.6 | −16.3 | 950 |
| 50 | 65 | 35 | 0.5 | 63.56 | 9.85 | 14.31 | 12.28 | 8930 | 0.6 | 9 × 10$^{10}$ | −21.1 | −16.6 | 950 |
| 51 | 65 | 35 | 3.0 | 63.56 | 9.85 | 14.31 | 12.28 | 8300 | 0.5 | 2 × 10$^{11}$ | −26.3 | −19.3 | 950 |
| 52 | 65 | 35 | 10.0 | 63.56 | 9.85 | 14.31 | 12.28 | 7700 | 1.3 | 3 × 10$^{10}$ | −29.1 | −17.7 | 900 |
| 53* | 65 | 35 | 15.0 | 63.56 | 9.85 | 14.31 | 12.28 | 6300 | 4.3 | 2 × 10$^8$ | −33.1 | −19.9 | 900 |
| 54* | 95 | 5 | 0 | 63.17 | 14.31 | 20.78 | 1.74 | 4100 | 3.8 | 2 × 10$^8$ | +47.2 | −30.6 | 950 |
| 55 | 95 | 5 | 0.05 | 63.17 | 14.31 | 20.78 | 1.74 | 4220 | 0.8 | 1 × 10$^{10}$ | +50.1 | −37.2 | 950 |
| 56 | 95 | 5 | 0.5 | 63.17 | 14.31 | 20.78 | 1.74 | 4100 | 0.6 | 4 × 10$^{10}$ | +55.2 | −43.6 | 950 |
| 57 | 95 | 5 | 3.0 | 63.17 | 14.31 | 20.78 | 1.74 | 3700 | 0.4 | 8 × 10$^{10}$ | +59.8 | −55.5 | 950 |
| 58 | 95 | 5 | 10.0 | 63.17 | 14.31 | 20.78 | 1.74 | 3180 | 1.8 | 2 × 10$^{10}$ | +63.2 | −56.3 | 900 |
| 59* | 95 | 5 | 15.0 | 63.17 | 14.31 | 20.78 | 1.74 | 2780 | 5.5 | 3 × 10$^8$ | +70.1 | −63.8 | 900 |

TABLE 1-5

| Sample No. | Basic Ingredients (mol %) Pb(Fe$_{2/3}$-W$_{1/3}$)O$_3$ | PbZrO$_3$ | Additive (wt %) Pb(Mn$_{2/3}$-W$_{1/3}$)O$_3$ | Proportion of Basic Oxides (wt %) PbO | Fe$_2$O$_3$ | WO$_3$ | ZrO$_2$ | $\epsilon_s$ | tan (%) | IR (Ω) | Temperature Dependence (%) −25° C. | +85° C. | Sintering Temperature (°C.) |
|---|---|---|---|---|---|---|---|---|---|---|---|---|---|
| 60* | 40 | 60 | 0 | 63.89 | 6.09 | 8.85 | 21.17 | 4820 | 3.4 | 2 × 10$^8$ | −41.9 | +21.1 | 950 |
| 61 | 40 | 60 | 0.05 | 63.89 | 6.09 | 8.85 | 21.17 | 5290 | 1.1 | 2 × 10$^{10}$ | −43.3 | +18.3 | 950 |
| 62 | 40 | 60 | 0.5 | 63.89 | 6.09 | 8.85 | 21.17 | 6480 | 0.8 | 6 × 10$^{10}$ | −49.6 | +16.2 | 950 |
| 63 | 40 | 60 | 3.0 | 63.89 | 6.09 | 8.85 | 21.17 | 5300 | 0.6 | 9 × 10$^{10}$ | −53.1 | +13.3 | 950 |
| 64 | 40 | 60 | 10.0 | 63.89 | 6.09 | 8.85 | 21.17 | 5080 | 1.3 | 3 × 10$^{10}$ | −56.6 | +12.6 | 850 |
| 65* | 40 | 60 | 15.0 | 63.89 | 6.09 | 8.85 | 21.17 | 3360 | 3.8 | 2 × 10$^8$ | −59.3 | +11.1 | 850 |
| 66* | 65 | 35 | 0 | 63.56 | 9.85 | 14.31 | 12.28 | 8020 | 3.6 | 6 × 10$^8$ | −17.4 | −12.6 | 950 |
| 67 | 65 | 35 | 0.05 | 63.56 | 9.85 | 14.31 | 12.28 | 8300 | 1.0 | 3 × 10$^{10}$ | −24.6 | −13.9 | 950 |

TABLE 1-5-continued

| Sample No. | Basic Ingredients (mol %) Pb(Fe$_{2/3}$W$_{1/3}$)O$_3$ | PbZrO$_3$ | Additive (wt %) Pb(Mn$_{1/3}$W$_{2/3}$)O$_3$ | Proportion of Basic Oxides (wt %) PbO | Fe$_2$O$_3$ | WO$_3$ | ZrO$_2$ | Electric Properties $\epsilon_s$ | tan (%) | IR (Ω) | Temperature Dependence (%) −25° C. | +85° C. | Sintering Temperature (°C.) |
|---|---|---|---|---|---|---|---|---|---|---|---|---|---|
| 68 | 65 | 35 | 0.5 | 63.56 | 9.85 | 14.31 | 12.28 | 8530 | 0.9 | 8 × 10$^{10}$ | −27.3 | −15.9 | 950 |
| 69 | 65 | 35 | 3.0 | 63.56 | 9.85 | 14.31 | 12.28 | 8110 | 0.6 | 8 × 10$^{10}$ | −30.1 | −19.1 | 950 |
| 70 | 65 | 35 | 1.0 | 63.56 | 9.85 | 14.31 | 12.28 | 7700 | 1.4 | 3 × 10$^{10}$ | −32.8 | −18.8 | 900 |
| 71* | 65 | 35 | 15.0 | 63.56 | 9.85 | 14.31 | 12.28 | 6300 | 4.4 | 4 × 10$^8$ | −37.6 | −19.3 | 900 |
| 72* | 95 | 5 | 0 | 63.17 | 14.31 | 20.78 | 1.74 | 4100 | 3.8 | 2 × 10$^8$ | +47.2 | −30.6 | 950 |
| 73 | 95 | 5 | 0.05 | 63.17 | 14.31 | 20.78 | 1.74 | 4320 | 1.0 | 1 × 10$^8$ | +53.3 | −38.3 | 950 |
| 74 | 95 | 5 | 0.5 | 63.17 | 14.31 | 20.78 | 1.74 | 4300 | 0.8 | 3 × 10$^8$ | +60.6 | −45.6 | 950 |
| 75 | 95 | 5 | 3.0 | 63.17 | 14.31 | 20.78 | 1.74 | 3900 | 0.4 | 6 × 10$^8$ | +66.7 | −57.2 | 950 |
| 76 | 95 | 5 | 10.0 | 63.17 | 14.31 | 20.78 | 1.74 | 3220 | 1.9 | 2 × 10$^{10}$ | +72.1 | −59.9 | 900 |
| 77 | 95 | 5 | 15.0 | 63.17 | 14.31 | 20.78 | 1.74 | 2730 | 5.3 | 1 × 10$^8$ | +76.6 | −61.8 | 900 |

TABLE 1-6

| Sample No. | Basic Ingredients (mol %) Pb(Fe$_{2/3}$W$_{1/3}$)O$_3$ | PbZrO$_3$ | Additive (wt %) Pb(Mn$_{1/2}$Ta$_{1/2}$)O$_3$ | Proportion of Basic Oxides (wt %) PbO | Fe$_2$O$_3$ | WO$_3$ | ZrO$_2$ | Electric Properties $\epsilon_s$ | tan (%) | IR (Ω) | Temperature Dependence (%) −25° C. | +85° C. | Sintering Temperature (°C.) |
|---|---|---|---|---|---|---|---|---|---|---|---|---|---|
| 78* | 40 | 60 | 0 | 63.89 | 6.09 | 8.85 | 21.17 | 4820 | 3.4 | 2 × 10$^8$ | −41.9 | +21.1 | 950 |
| 79 | 40 | 60 | 0.05 | 63.89 | 6.09 | 8.85 | 21.17 | 5760 | 1.7 | 2 × 10$^{10}$ | −42.2 | +18.8 | 950 |
| 80 | 40 | 60 | 0.5 | 63.89 | 6.09 | 8.85 | 21.17 | 6830 | 1.4 | 4 × 10$^{10}$ | −45.5 | +10.3 | 950 |
| 81 | 40 | 60 | 3.0 | 63.89 | 6.09 | 8.85 | 21.17 | 6350 | 1.2 | 3 × 10$^{10}$ | −53.1 | +4.6 | 950 |
| 82 | 40 | 60 | 10.0 | 63.89 | 6.09 | 8.85 | 21.17 | 5820 | 1.5 | 1 × 10$^{10}$ | −56.6 | +1.6 | 850 |
| 83* | 40 | 60 | 15.0 | 63.89 | 6.09 | 8.85 | 21.17 | 5530 | 3.5 | 2 × 10$^8$ | −66.6 | −9.3 | 850 |
| 84* | 65 | 35 | 0 | 63.56 | 9.85 | 14.31 | 12.28 | 8020 | 3.7 | 6 × 10$^8$ | −17.4 | −12.6 | 950 |
| 85 | 65 | 35 | 0.05 | 63.56 | 9.85 | 14.31 | 12.28 | 8110 | 1.8 | 1 × 10$^{10}$ | −18.6 | −16.2 | 950 |
| 86 | 65 | 35 | 0.5 | 63.56 | 9.85 | 14.31 | 12.28 | 9050 | 1.5 | 3 × 10$^{10}$ | −23.2 | −19.2 | 950 |
| 87 | 65 | 35 | 3.0 | 63.56 | 9.85 | 14.31 | 12.28 | 8520 | 1.3 | 2 × 10$^{10}$ | −28.8 | −29.5 | 950 |
| 88 | 65 | 35 | 10.0 | 63.56 | 9.85 | 14.31 | 12.28 | 7580 | 1.6 | 2 × 10$^{10}$ | −31.6 | −32.8 | 900 |
| 89* | 65 | 35 | 15.0 | 63.56 | 9.85 | 14.31 | 12.28 | 6190 | 4.6 | 3 × 10$^8$ | −39.3 | −31.5 | 900 |
| 90* | 95 | 5 | 0 | 63.17 | 14.31 | 20.78 | 1.74 | 4100 | 3.8 | 2 × 10$^8$ | +47.2 | −30.6 | 950 |
| 91 | 95 | 5 | 0.05 | 63.17 | 14.31 | 20.78 | 1.74 | 4100 | 1.9 | 2 × 10$^{10}$ | +51.1 | −37.6 | 950 |
| 92 | 95 | 5 | 0.5 | 63.17 | 14.31 | 20.78 | 1.74 | 4310 | 1.6 | 3 × 10$^{10}$ | +56.6 | −40.5 | 950 |
| 93 | 95 | 5 | 3.0 | 63.17 | 14.31 | 20.78 | 1.74 | 4000 | 1.3 | 2 × 10$^{10}$ | +60.1 | −52.8 | 950 |
| 94 | 95 | 5 | 10.0 | 63.17 | 14.31 | 20.78 | 1.74 | 3290 | 1.7 | 1 × 10$^{10}$ | +65.2 | −56.8 | 900 |
| 95* | 95 | 5 | 15.0 | 63.17 | 14.31 | 20.78 | 1.74 | 2510 | 5.9 | 2 × 10$^8$ | +71.8 | −68.9 | 900 |

TABLE 1-7

| Sample No. | Basic Ingredients (mol %) Pb(Fe$_{2/3}$W$_{1/3}$)O$_3$ | PbZrO$_3$ | Additive (wt %) Cr$_2$O$_3$/CeO$_2$ | Proportion of Basic Oxides (wt %) PbO | Fe$_2$O$_3$ | WO$_3$ | ZrO$_2$ | Electric Properties $\epsilon_s$ | tan (%) | IR (Ω) | Temperature Dependence (%) −25° C. | +85° C. | Sintering Temperature (°C.) |
|---|---|---|---|---|---|---|---|---|---|---|---|---|---|
| 96* | 40 | 60 | 0 | 63.89 | 6.09 | 8.85 | 21.17 | 4820 | 3.4 | 2 × 10$^8$ | −41.9 | +21.1 | 950 |
| 97 | 40 | 60 | 0.05 | 63.89 | 6.09 | 8.85 | 21.17 | 5130 | 1.7 | 1 × 10$^{10}$ | +50.3 | +10.2 | 950 |
| 98 | 40 | 60 | 0.5 | 63.89 | 6.09 | 8.85 | 21.17 | 5350 | 1.6 | 2 × 10$^{10}$ | +56.6 | +2.1 | 950 |
| 99 | 40 | 60 | 3.0 | 63.89 | 6.09 | 8.85 | 21.17 | 5690 | 1.3 | 1.5 × 10$^{10}$ | +60.6 | −8.8 | 950 |
| 100 | 40 | 60 | 10.0 | 63.89 | 6.09 | 8.85 | 21.17 | 5020 | 1.4 | 1 × 10$^{10}$ | +63.8 | −12.6 | 850 |
| 101* | 40 | 60 | 15.0 | 63.89 | 6.09 | 8.85 | 21.17 | 4610 | 3.9 | 9 × 10$^7$ | −72.8 | −21.1 | 850 |
| 102* | 65 | 35 | 0 | 63.56 | 9.85 | 14.31 | 12.28 | 8020 | 3.7 | 6 × 10$^8$ | −17.4 | −12.6 | 950 |
| 103 | 65 | 35 | 0.05 | 63.56 | 9.85 | 14.31 | 12.28 | 8220 | 1.9 | 2 × 10$^{10}$ | −23.3 | −18.3 | 950 |
| 104 | 65 | 35 | 0.5 | 63.56 | 9.85 | 14.31 | 12.28 | 8170 | 1.7 | 1.5 × 10$^{10}$ | −28.6 | <22.2 | 950 |
| 105 | 65 | 35 | 3.0 | 63.56 | 9.85 | 14.31 | 12.28 | 7710 | 1.4 | 1.5 × 10$^{10}$ | −32.2 | −28.8 | 950 |
| 106 | 65 | 35 | 10.0 | 63.56 | 9.85 | 14.31 | 12.28 | 7030 | 1.6 | 1 × 10$^{10}$ | −36.8 | −32.7 | 900 |
| 107* | 65 | 35 | 15.0 | 63.56 | 9.85 | 14.31 | 12.28 | 5980 | 4.8 | 1 × 10$^8$ | −40.3 | −43.3 | 900 |
| 108 | 95 | 5 | 0 | 63.17 | 14.31 | 20.78 | 1.74 | 4100 | 3.8 | 2 × 10$^8$ | +47.2 | −30.6 | 950 |
| 109 | 95 | 5 | 0.05 | 63.17 | 14.31 | 20.78 | 1.74 | 4070 | 1.9 | 1 × 10$^{10}$ | +53.3 | −39.3 | 950 |
| 110 | 95 | 5 | 0.5 | 63.17 | 14.31 | 20.78 | 1.74 | 3990 | 1.8 | 2 × 10$^{10}$ | +58.8 | −48.8 | 950 |
| 111 | 95 | 5 | 3.0 | 63.17 | 14.31 | 20.78 | 1.74 | 3180 | 1.5 | 3 × 10$^{10}$ | +61.9 | −57.7 | 950 |
| 112 | 95 | 5 | 10.0 | 63.17 | 14.31 | 20.78 | 1.74 | 2900 | 1.8 | 1.5 × 10$^{10}$ | +70.7 | −63.1 | 900 |
| 113* | 95 | 5 | 15.0 | 63.17 | 14.31 | 20.78 | 1.74 | 2470 | 6.6 | 1.5 × 10$^8$ | +80.9 | −66.5 | 900 |

What we claim is:

1. A high dielectric constant type, ceramic composition, referred to as the basic ceramic composition, which consists essentially of from 63.17 to 63.89% of PbO, from 6.09 to 14.31% of Fe$_2$O$_3$, from 8.85 to 20.78% of WO$_3$ and from 1.74 to 21.17% of ZrO$_2$, all percentages being by weight based on the basic composition.

2. A high dielectric constant type, ceramic composition according to claim 1, wherein the basic composition exhibits a dielectric constant of from 4820 to 8020, and a dielectric loss (tan δ at 1 KHz) of from 3.0 to 3.8%.

3. A high dielectric constant type, ceramic composition according to claim 1, wherein said ceramic composition further comprises an additive of MnO in an amount of from 0.05 to 3.0 parts by weight, based on 100 weight parts of the basic composition.

4. A high dielectric constant type, ceramic composition according to claim 3, wherein said ceramic composition exhibits a dielectric constant of from approximately 5020 to 8370, a dielectric loss (tan δ at 1 KHz) of from 0.5 to 1.4% and an insulation resistance of from $2 \times 10^{10}$ to $1 \times 10^{11} \Omega$.

5. A high dielectric constant type, ceramic composition according to claim 1, wherein said ceramic composition further comprises an additive of $Pb(Mn_{\frac{1}{3}}Nb_{\frac{2}{3}})O_3$ in an amount of from 0.05 to 10.0 parts by weight, based on 100 weight parts of the basic composition.

6. A high dielectric constant type-, ceramic composition according to claim 5, wherein said composition exhibits a dielectric constant of from approximately 4100 to 8900, a dielectric loss (tan δ at 1 KHz) of from 1.0 to 1.8% and an insulation resistance of from $3 \times 10^{10}$ to $3 \times 10^{11} \Omega$.

7. A high dielectric constant type, ceramic composition according to claim 1, wherein said ceramic composition further comprises an additive of $Pb(Mn_{\frac{1}{2}}W_{\frac{1}{2}})O_3$ in an amount of from 0.05 to 10.0 parts by weight, based on 100 weight parts of the basic composition.

8. A high dielectric constant type, ceramic composition according to claim 7, wherein said ceramic composition exhibits a dielectric constant of from approximately 5380 to 8930, a dielectric loss (tan δ at 1 KHz) of from 0.4 to 1.8% and an insulation resistance of from $1 \times 10^{10}$ to $2 \times 10^{11} \Omega$.

9. A high dielectric constant type, ceramic composition according to claim 1, wherein said ceramic composition further comprises an additive of $Pb(Mn_{\frac{2}{3}}W_{\frac{1}{3}})O_3$ in an amount of from 0.05 to 10.0 parts by weight, based on 100 weight parts of the basic ceramic composition.

10. A high dielectric constant type, ceramic composition according to claim 9, wherein said ceramic composition exhibits a dielectric constant of from approximately 5290 to 8530, a dielectric loss (tan δ at 1 KHz) of from 0.4 to 1.9% and an insulation resistance of from $1 \times 10^{8}$ to $9 \times 10^{10} \Omega$.

11. A high dielectric constant type, ceramic composition according to claim 1, wherein said ceramic composition further comprises an additive of $Pb(Mn_{\frac{1}{2}}Ta_{\frac{2}{3}})O_3$ in an amount of from 0.05 to 10.0 parts by weight, based on 100 weight parts of the basic ceramic composition.

12. A high dielectric constant type, ceramic composition according to claim 11, said ceramic composition exhibits a dielectric constant of from approximately 5760 to 9050, a dielectric loss (tan δ at 1 KHz) of from 1.2 to 1.9% and an insulation resistance of from $1 \times 10^{10}$ to $4 \times 10^{10} \Omega$.

13. A high dielectric constant type, ceramic composition according to claim 1, wherein said ceramic composition further comprises at least one member selected from the group consisting of $Cr_2O_3$ and $CeO_2$ in an amount of from 0.05 to 2.0 parts by weight, based on 100 parts of the basic composition.

14. A high dielectric constant type, ceramic composition according to claim 13, wherein said ceramic composition exhibits a dielectric constant of from approximately 5130 to 8220, a dielectric loss (tan δ at 1 KHz) of from 1.3 to 1.9% and an insulation resistance of from $1 \times 10^{10}$ to $3 \times 10^{10} \Omega$.

15. A high dielectric constant type, ceramic composition according to claim 5, 7, 9, or 11, wherein the content of said additive is from 0.5 to 10.0 parts by weight.

16. A high dielectric constant type, ceramic composition according to claim 3, 5, 7, 9, or 11, wherein the content of said additive is from 0.5 to 3 parts by weight.

17. A high dielectric constant type, ceramic composition according to claim 1, 3, 5, 7, 9, 11 or 13, wherein said basic ceramic composition consists essentially of from 63.17 to 63.89% of PbO, from 6.09 to 10% of $Fe_2O_3$, from 8.85 to 15% of $WO_3$ and from 12 to 21.17% of $ZrO_2$.

18. A high dielectric constant type, ceramic composition according to claim 16, wherein said ceramic composition exhibits a variance of the dielectric constant at a temperature increase of from 20° to 85° C. in an amount of approximately 30% or less.

19. A high dielectric constant type, ceramic composition according to claim 1, 3, 5, 7, 9, 11 or 13, wherein said basic ceramic composition consists essentially of from 63.17 to 63.89% of PbO, from 7 to 12% of $Fe_2O_3$, from 11 to 18% of $WO_3$ and from 7 to 18% of $ZrO_2$.

* * * * *

UNITED STATES PATENT AND TRADEMARK OFFICE
CERTIFICATE OF CORRECTION

PATENT NO. : 4,235,635
DATED : November 25, 1980
INVENTOR(S) : Osamu Iizawa, et al It is certified that error appears in the above—identified patent and that said Letters Patent is hereby corrected as shown below:

Col. 3, line 60, after "lower" insert --than--.

Col. 11, line 19, after "type" delete -- - --.

Signed and Sealed this

Second Day of June 1981

[SEAL]

Attest:

RENE D. TEGTMEYER

Attesting Officer     Acting Commissioner of Patents and Trademarks